United States Patent
Cho et al.

(10) Patent No.: US 11,435,614 B2
(45) Date of Patent: Sep. 6, 2022

(54) POLARIZING PLATE AND OPTICAL DISPLAY APPARATUS COMPRISING THE SAME

(71) Applicant: SAMSUNG SDI CO., LTD., Yongin-si (KR)

(72) Inventors: Kyoung Min Cho, Suwon-si (KR); Young Oh, Suwon-si (KR); Dong Ho Wee, Suwon-si (KR); Jang Hyun Cho, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 61 days.

(21) Appl. No.: 16/840,053

(22) Filed: Apr. 3, 2020

(65) Prior Publication Data

US 2020/0319506 A1 Oct. 8, 2020

(30) Foreign Application Priority Data

Apr. 8, 2019 (KR) .......................... 10-2019-0040832

(51) Int. Cl.
*G02F 1/1335* (2006.01)
*G02B 5/30* (2006.01)

(52) U.S. Cl.
CPC ....... *G02F 1/133528* (2013.01); *G02B 5/305* (2013.01); *C09K 2323/03* (2020.08); *C09K 2323/031* (2020.08)

(58) Field of Classification Search
CPC ......... G02F 1/133528; G02F 1/133504; G02B 5/30; G02B 5/305; G02B 5/0215; G02B 5/0221; C09K 2323/021
See application file for complete search history.

(56) References Cited

U.S. PATENT DOCUMENTS

2003/0214739 A1   11/2003  Funamoto et al.
2010/0214506 A1*  8/2010  Gaides ................ G02B 5/0263
                                                   349/61

(Continued)

FOREIGN PATENT DOCUMENTS

CN        101978311 A    2/2011
CN        102203640 A    9/2011

(Continued)

OTHER PUBLICATIONS

Korean Office Action dated Dec. 27, 2021 for Application No. 10-2019-0040832, 4 pages.

(Continued)

*Primary Examiner* — Sophie Hon
(74) *Attorney, Agent, or Firm* — Lewis Roca Rothgerber Christie LLP

(57) ABSTRACT

A polarizing plate and an optical display apparatus including the same are provided. A polarizing plate includes: a polarizer; and a pattern layer on a surface of the polarizer and including a first resin layer and a second resin layer facing the first resin layer, the first resin layer including a patterned portion located at at least a portion thereof facing the second resin layer, the patterned portion includes at least two embossed optical patterns and a flat section formed between a pair of adjacent embossed optical patterns, each of the embossed optical patterns includes an upper surface defining a wave pattern, and the wave pattern has a value of about 20% to 60%, as calculated according to Formula 1 herein, and a pitch of greater than about 100 μm and less than about 400 μm.

20 Claims, 2 Drawing Sheets

(56) References Cited

U.S. PATENT DOCUMENTS

2016/0178958 A1* 6/2016 Son .................. G02B 1/14
                                                  349/96
2018/0045876 A1* 2/2018 Lee ................ G02B 6/0053

FOREIGN PATENT DOCUMENTS

| CN | 107667313 A | | 2/2018 | |
|----|---|---|---|---|
| CN | 108287429 A | | 7/2018 | |
| CN | 109471289 A | | 3/2019 | |
| JP | 2006-251659 A | | 9/2006 | |
| JP | 2006251659 A | * | 9/2006 | |
| KR | 10-2017-0122611 A | | 11/2017 | |
| TW | I719878 B1 | * | 2/2021 | ....... G02F 1/133528 |
| WO | WO-2016175580 A1 | * | 11/2016 | ....... G02F 1/133528 |

OTHER PUBLICATIONS

Chinese Office Action dated Sep. 24, 2021 for Application No. 202010268539.0, 8 pages.

\* cited by examiner

POLARIZING PLATE AND OPTICAL DISPLAY APPARATUS COMPRISING THE SAME

CROSS-REFERENCE TO RELATED APPLICATION

This application claims priority to and the benefit of Korean Patent Application No. 10-2019-0040832, filed on Apr. 8, 2019 in the Korean Intellectual Property Office, the entire disclosure of which is incorporated herein by reference.

BACKGROUND

1. Field

Aspects of embodiments of the present invention relate to a polarizing plate and an optical display apparatus including the same.

2. Description of the Related Art

A liquid crystal display is operated to emit light through a liquid crystal panel after receiving the light from a backlight unit. Since light from the backlight unit is incident at a right angle to a screen of the liquid crystal display, side contrast (CR) of the screen of the liquid crystal display is lower than front contrast of the screen, causing occurrence of color shift. In order to solve such a problem, an optical film including a pattern layer having a fine pattern structure may be used in a viewer-side polarizing plate of the liquid crystal display.

However, such a pattern structure can cause appearance of Moiré patterns on an optical display apparatus. Further, since the pattern structure is used in a viewer-side polarizing plate of the optical display apparatus, Moiré patterns become more prominent. In order to solve this problem, a film having the pattern structure may be disposed to be tilted at a certain angle (e.g., a predetermined angle) with respect to pixels in a liquid crystal panel to reduce appearance of Moiré patterns. However, tilting the film having the pattern structure with respect to the pixels of the panel is hardly effective in reducing appearance of Moiré patterns when applied to a large-area optical display apparatus. Therefore, there is a need for a polarizing plate which includes an optical film capable of providing reduction in color shift and improvement in contrast while preventing or substantially preventing appearance of Moiré patterns even when used in a large-area optical display apparatus.

The background technique of the present invention is disclosed in Japanese Unexamined Patent Publication No. 2006-251659.

SUMMARY

According to aspects of embodiments of the present invention, a polarizing plate which can provide improvement in contrast and reduction in side color shift while preventing or substantially preventing appearance of Moiré patterns, and an optical display apparatus including the same, are provided.

According to one aspect of embodiments of the present invention, a polarizing plate which can prevent or substantially prevent appearance of Moiré patterns when used in a large-area optical display apparatus is provided.

According to another aspect of embodiments of the present invention, a polarizing plate which can reduce side color shift is provided.

According to another aspect of embodiments of the present invention, a polarizing plate which can improve front contrast and side contrast is provided.

According to one or more embodiments of the present invention, a polarizing plate includes: a polarizer; and a pattern layer formed on a surface of the polarizer and including a first resin layer and a second resin layer facing the first resin layer, the first resin layer including a patterned portion located at at least a portion thereof facing the second resin layer, wherein the patterned portion includes at least two embossed optical patterns and a flat section between a pair of adjacent embossed optical patterns of the embossed optical patterns, each of the embossed optical patterns includes an upper surface defining a wave pattern, and the wave pattern has a value of about 20% to 60%, as calculated according to the following Formula 1:

$$(|H1-H2|/H1) \times 100,$$

where H1 denotes a maximum height (unit: μm) of the embossed optical pattern, as measured within the wave pattern, and H2 denotes a minimum height (unit: μm) of the embossed optical pattern, as measured within the wave pattern, and the wave pattern has a pitch of greater than about 100 μm and less than about 400 μm.

In one or more embodiments, the wave pattern may include a curved surface defined by a continuous succession of a convex surface and a concave surface, wherein an uppermost point of a convex surface of a first embossed optical pattern may be located between uppermost points of a pair of respective adjacent convex surfaces of a second embossed optical pattern adjacent to the first embossed optical pattern.

In one or more embodiments, the convex surface may have a maximum length equal to or different from a maximum length of the concave surface.

In one or more embodiments, the wave pattern may include a curved surface defined by a continuous succession of a convex surface and a concave surface, wherein the convex surface may have a maximum width H3 greater than a maximum width H4 of the concave surface, and H3-H4 may have a value of greater than 0.1 μm and less than or equal to 1 μm.

In one or more embodiments, the embossed optical pattern may satisfy the following Formula 2:

$$1 < P/W \leq 10,$$

where P denotes a pitch (unit: μm) of the patterned portion, and W denotes a maximum width (unit: μm) of the optical pattern, and the embossed optical pattern may have a base angle θ of greater than or equal to about 75° and less than about 90°.

In one or more embodiments, the embossed optical pattern may have a trapezoidal, rectangular, or square cross-section.

In one or more embodiments, the second resin layer may directly adjoin the embossed optical patterns and the flat section.

In one or more embodiments, the first resin layer may have a different index of refraction than the second resin layer.

In one or more embodiments, the first resin layer may have a smaller index of refraction than the second resin layer.

In one or more embodiments, a longitudinal direction of the embossed optical pattern may be at an angle of about −5° to about +5° with respect to an absorption axis direction of the polarizer.

In one or more embodiments, the polarizing plate may further include: a protective layer formed on a surface of the pattern layer.

According to one or more embodiments, an optical display apparatus may include the polarizing plate according to any of the above-described embodiments.

According to an aspect of embodiments of the present invention, a polarizing plate may prevent or substantially prevent appearance of Moiré patterns when used in a large-area optical display apparatus.

According to another aspect of embodiments of the present invention, a polarizing plate may have reduced side color shift.

According to another aspect of embodiments of the present invention, a polarizing plate may have improved front contrast and side contrast.

DETAILED DESCRIPTION

Figure 1:
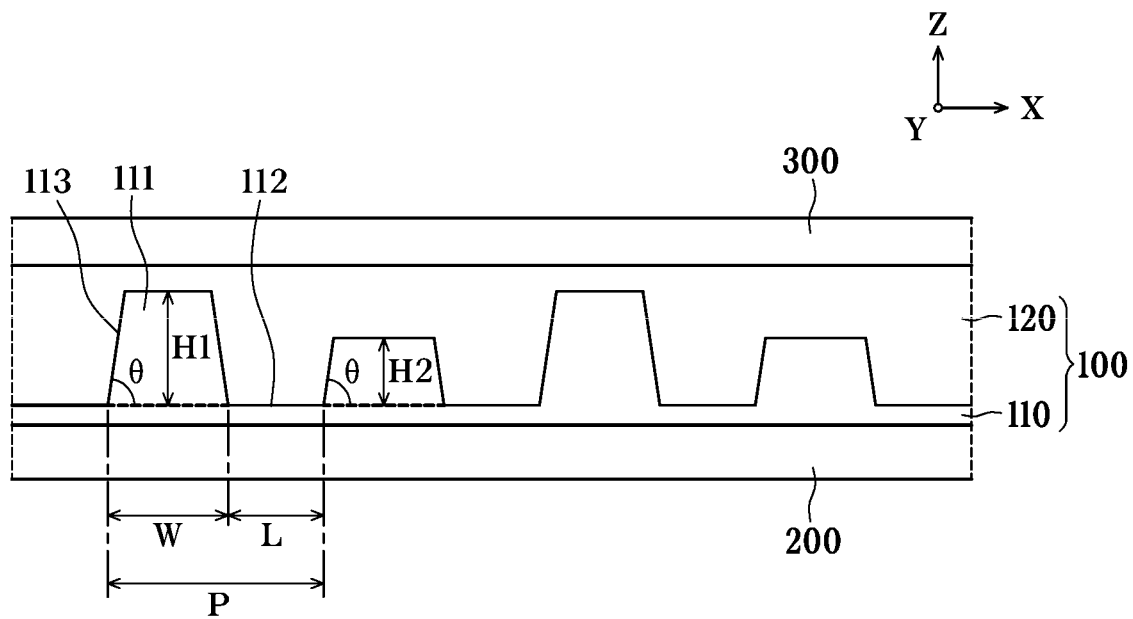
FIG. 1 is a cross-sectional view of a polarizing plate according to an embodiment of the present invention.

Herein, some example embodiments of the present invention will be described in further detail with reference to the accompanying drawings such that the present invention can be easily implemented by those skilled in the art. It is to be understood that the present invention may be embodied in different ways and is not limited to the following embodiments. In the drawings, portions irrelevant to the description may be omitted for clarity. Like components will be denoted by like reference numerals throughout the specification.

Herein, spatially relative terms, such as "upper" and "lower," are defined with reference to the accompanying drawings. Thus, it is to be understood that the term "upper surface" can be used interchangeably with the term "lower surface," and when an element, such as a layer or film, is referred to as being placed "on" another element, it may be directly placed on the other element, or one or more intervening elements may be present. On the other hand, when an element is referred to as being placed "directly on" another element, there are no intervening element(s) therebetween.

Herein, "horizontal direction" and "vertical direction" refer to the major and minor directions of a rectangular liquid crystal display screen, respectively. Herein, "side" refers to (0°, 60°) or (0°, 80°) in the spherical coordinate system represented by ($\phi$, $\theta$) in which the front is indicated by (0°, 0°), a left end point is indicated by (180°, 90°), and a right end point is indicated by (0°, 90°) with reference to the horizontal direction.

Herein, "aspect ratio" refers to a ratio of maximum height of an embossed optical pattern to maximum width thereof (maximum height/maximum width).

Herein, "in-plane retardation (Re)" is a value measured at a wavelength of about 550 nm and is represented by the following Equation A:

$$Re = (n_x - n_y) \times d,$$

where $n_x$ and $n_y$ are indexes of refraction in the slow axis- and fast axis-directions of a corresponding protective layer or base layer at a wavelength of about 550 nm, respectively, and d is a thickness (unit: nm) of the protective layer or base layer.

Herein, the term "(meth)acryl" refers to acryl and/or methacryl.

Unless otherwise defined, all terms (including technical and scientific terms) used herein have the same meaning as commonly understood by one of ordinary skill in the art to which example embodiments of the inventive concept belong. It is to be further understood that terms, such as those defined in commonly-used dictionaries, should be interpreted as having a meaning that is consistent with their meaning in the context of the relevant art and will not be interpreted in an idealized or overly formal sense unless expressly so defined herein.

According to an aspect of one or more embodiments of the present invention, a polarizing plate including a pattern layer including a patterned portion, wherein the patterned portion includes embossed optical patterns each having an upper surface forming a wave pattern satisfying Formula 1 and having a pitch falling within a range specified herein, can provide improvement in contrast, reduction in side color shift, and prevention or reduction of appearance of Moiré patterns when used in a large-area optical display apparatus. According to an aspect, with the wave pattern satisfying Formula 1 and having a pitch falling within a range specified herein, the polarizing plate according to the present invention can provide improvement in contrast, reduction in side color shift, and prevention or reduction of appearance of Moiré patterns regardless of the width of a flat section formed between the optical patterns.

In one or more embodiments, the polarizing plate according to the present invention may be used as a viewer-side polarizing plate in an optical display apparatus, for example, a liquid crystal display. Herein, the term "viewer-side polarizing plate" refers to a polarizing plate disposed on a light exit surface of a liquid crystal panel, that is, a polarizing plate disposed at a side of a screen of the liquid crystal panel that is at a side opposite a light source.

Now, a polarizing plate according to an embodiment of the present invention will be described with reference to FIG. 1 and FIG. 2.

Referring to FIG. 1, a polarizing plate according to an embodiment includes: a polarizer 200; a pattern layer 100; and a protective layer 300.

In the polarizing plate, the pattern layer 100 and the protective layer 300 are formed on a surface of the polarizer 200 in the stated order. In one embodiment, the pattern layer 100 and the protective layer 300 are laminated on a light exit surface of the polarizer 200 in the stated order.

The pattern layer 100 includes a first resin layer 110 and a second resin layer 120 facing the first resin layer 110. In an embodiment, the first resin layer 110 is directly formed on the second resin layer 120 such that the pattern layer 100 is composed of only the first resin layer 110 and the second resin layer 120.

The first resin layer 110 is formed on a light entry surface of the second resin layer 120 to allow incoming light from a lower surface of the first resin layer 110 to exit to the second resin layer 120. The first resin layer 110 may diffuse incoming light from the lower surface thereof by refracting the light in various directions depending on incident positions of the light.

In an embodiment, the first resin layer 110 is directly formed on the second resin layer 120 and includes a patterned portion formed at an interface with the second resin layer 120 (a lower surface of the second resin layer). In FIG. 1, the patterned portion is shown as completely contacting the second resin layer 120. However, it is to be understood that the present invention is not limited thereto, and the patterned portion may contact at least a portion of the second resin layer 120. In an embodiment, the patterned portion completely contacts the second resin layer 120. The second resin layer 120 directly adjoins embossed optical patterns and a flat section of the first resin layer 110.

The patterned portion includes: at least two embossed optical patterns 111; and a flat section 112 formed between a pair of adjacent embossed optical patterns 111. The patterned portion includes a repeated combination of the embossed optical pattern 111 and the flat section 112. Herein, the expression "embossed optical pattern" means that the optical pattern is shaped to protrude from the first resin layer 110 toward the second resin layer 120.

The embossed optical pattern 111 may have an upper surface and at least two inclined surfaces connected to the upper surface.

Although not shown in FIG. 1, the embossed optical patterns 111 may extend in a stripe shape in a longitudinal direction thereof. Here, the longitudinal direction of the embossed optical pattern 111 may be substantially the same as an absorption axis direction of the polarizer 200 described below. In an embodiment, for example, the longitudinal direction of the embossed optical pattern 111 may be at an angle of about −5° to about +5° with respect to the absorption axis direction of the polarizer 200. Within this range, the embossed optical pattern 111 can facilitate reduction of appearance of Moiré patterns on a display panel.

The upper surface of the embossed optical pattern 111 forms a wave pattern. In an embodiment, the wave pattern is a curved surface consisting of a continuous succession of a convex surface and a concave surface. The wave pattern will be described in further detail with reference to FIG. 2.

Figure 2:
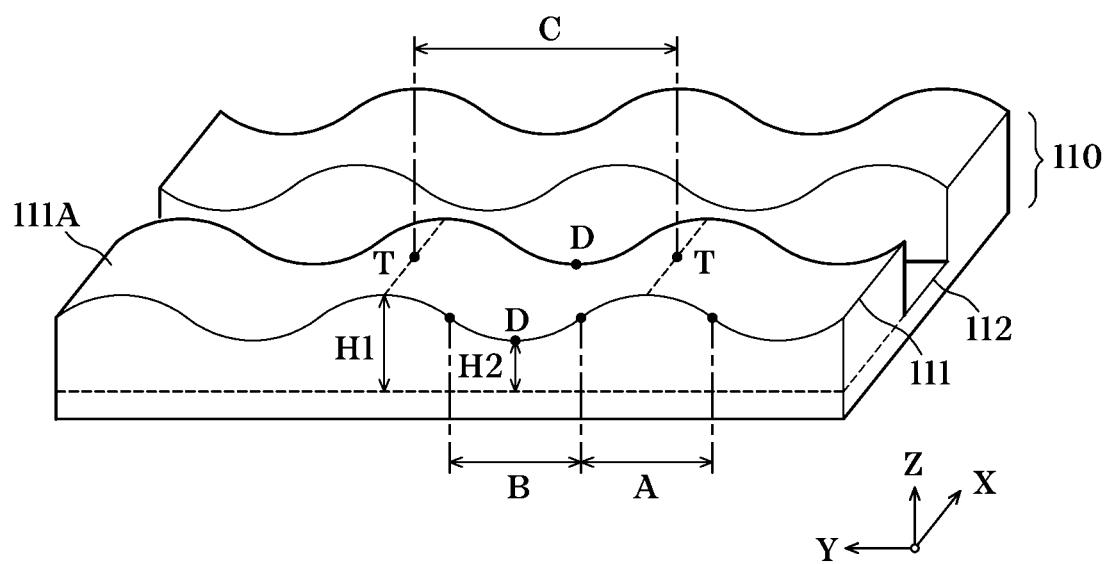
FIG. 2 is a perspective view of a portion of an embossed optical pattern of a polarizing plate according to an embodiment.

Referring to FIG. 2, the embossed optical pattern 111 has an upper surface 111A forming a wave pattern in which convex and concave surfaces are alternately formed in a consecutive manner. The wave pattern extends in a longitudinal direction of the embossed optical pattern 111. The convex surface may have a maximum length A equal to or different from a maximum length B of the concave surface.

The convex surface is a curved surface having an uppermost point T of the wave pattern therein. The concave surface is a curved surface having a lowermost point D of the wave pattern therein. In an embodiment, the wave pattern is formed over the entire upper surface of the embossed optical pattern 111. When the uppermost points of the wave pattern lie in respective convex surfaces, the pattern layer can secure improvement in contrast. For example, if the embossed optical pattern has a triangular cross-section and uppermost points of the wave pattern thus lie in one line rather than in the respective convex surfaces, the pattern layer may be hardly effective in providing improvement in contrast and reduction in color shift and thus may be inadequate for use in the polarizing plate.

In an embodiment, the wave pattern has a pitch C of greater than about 100 μm and less than about 400 μm (for example, 110 μm, 120 μm, 130 μm, 140 μm, 150, μm, 160 μm, 170 μm, 180 μm, 190 μm, 200 μm, 210 μm, 220 μm, 230 μm, 240 μm, 250 μm, 260 μm, 270 μm, 280 μm, 290 μm, 300 μm, 310 μm, 320 μm, 330 μm, 340 μm, 350 μm, 360 μm, 370 μm, 380 μm, or 390 μm). Within this range, the polarizing plate can prevent or substantially prevent appearance of Moiré patterns when used in a large-area optical display apparatus. In an embodiment, the wave pattern has a pitch C of about 150 μm to about 350 μm, and, in an embodiment, about 200 μm to about 300 μm. Herein, the pitch C is a minimum distance between uppermost points T in a pair of respective adjacent convex surfaces of the wave pattern of one optical pattern 111 or a minimum distance between lowermost points D in a pair of respective adjacent concave surfaces of the wave pattern of one optical pattern 111.

Referring to FIG. 2, in an embodiment, uppermost points in respective convex surfaces of the wave pattern of one optical pattern 111 are not collinear with uppermost points in respective convex surfaces of the wave pattern of another optical pattern 111 adjacent to the one optical pattern 111. In other words, an uppermost point (a first uppermost point) of the wave pattern of one optical pattern 111 is located between a pair of adjacent uppermost points (second and third uppermost points) of the wave pattern of another optical pattern 111 adjacent to the one optical pattern 111. With this arrangement, the polarizing plate can be further effective in preventing or substantially preventing appearance of Moiré patterns when used in a large-area optical display apparatus.

The wave pattern satisfies Formula 1. Formula 1 will be described with reference to FIG. 2. Referring to FIG. 2, the wave pattern has a value of about 20% to about 60% (for example, 20%, 30%, 40%, 50%, or 60%), as calculated according to Formula 1. Within this range, the polarizing plate can provide improvement in front contrast and side contrast and reduction in side color shift while preventing or substantially preventing appearance of Moiré patterns when used in a large-area optical display apparatus.

$$(|H1-H2|/H1) \times 100, \quad \text{Formula 1:}$$

where H1 denotes a maximum height (unit: μm) of the embossed optical pattern 111, as measured within the wave pattern, and H2 denotes a minimum height (unit: μm) of the embossed optical pattern 111, as measured within the wave pattern.

In an embodiment, the wave pattern has a value of about 30% to about 40%, as calculated according to Formula 1.

In the present invention, in order to prevent or substantially prevent appearance of Moiré patterns and to provide improvement in contrast and reduction in side color shift, the upper surface of the optical pattern 111 forms the wave pattern, a ratio of difference between the maximum height and the minimum height of the embossed optical pattern 111 to the maximum height, as measured within the wave pattern, is adjusted or set to have a specific value, and the pitch of the wave pattern is adjusted or set to fall within a specific range.

In an embodiment, in Formula 1, |H1−H2| may have a value of about 1 μm to about 10 μm, and, in an embodiment, about 2 μm to about 6 μm. Within this range, the polarizing plate can be effective in preventing or substantially preventing appearance of Moiré patterns.

The convex surface may have a maximum width equal to or different from a maximum width of the concave surface. In an embodiment, the convex surface has a maximum width equal to the maximum width of the concave surface to improve manufacturing processability.

Referring to FIG. 1 again, in an embodiment, the embossed optical pattern 111 may satisfy Formula 2 below and may have a base angle θ of about 75° to about 90° (for example, 75°, 80°, 85°, or 90°). Here, the base angle θ refers to an angle formed between an inclined surface 113 of the embossed optical pattern 111 and the maximum width W of the embossed optical pattern 111. Here, the inclined surface 113 refers to an inclined surface of the embossed optical pattern 111 which is directly connected to the flat section 112. Within this range of base angle, the pattern layer can improve side contrast while increasing contrast at a given side viewing angle. In an embodiment, the embossed optical pattern may have a base angle θ of about 80° to about 90°, and P/W (a ratio of P to W) may have a value of about 1.2 to about 8.

$$1 < P/W \leq 10, \qquad \text{Formula 2:}$$

where P denotes a pitch (unit: μm) of the patterned portion and W denotes a maximum width (unit: μm) of the optical pattern.

The pitch P of the patterned portion is the sum of a maximum width of one optical pattern and a width of one flat section adjacent thereto. In an embodiment, the patterned portion may have a pitch P of about 1 μm to about 50 μm, and, in an embodiment, about 1 μm to about 40 μm. Within this range, the pattern layer can provide improvement in contrast while preventing or substantially preventing appearance of Moiré patterns.

Although the embossed optical pattern is shown as having the same base angle at both sides thereof in FIG. 1, it will be understood that embodiments of the present invention are not limited thereto, and the embossed optical pattern may have different base angles falling within the range set forth above (about 70° to about 90°).

Although the embossed optical pattern is shown as having a trapezoidal cross-section, it is to be understood that embodiments of the present invention are not limited thereto, and the optical pattern may have a rectangular or square cross-section, for example. In an embodiment, the embossed optical pattern has a trapezoidal cross-section. If the optical pattern has a triangular cross-section, the pattern layer may be hardly effective in improving contrast.

In an embodiment, the upper surface of the embossed optical pattern 111 may have a width of about 10 μm to about 30 μm, and, in an embodiment, about 10 μm to about 21 μm. Within this range, the polarizing plate can be used in an optical display apparatus and can provide improvement in contrast.

The optical pattern 111 may include optical patterns having different aspect ratios. In an embodiment, the optical pattern 111 may have a maximum aspect ratio (H1/W) of about 0.1 to about 10, and, in an embodiment, about 0.1 to about 7.0, and, in an embodiment, about 0.1 to about 5.0, and, in an embodiment, about 0.1 to about 1.0. Within this range, the polarizing plate can improve side contrast and side viewing angle when used in an optical display apparatus. In an embodiment, the optical pattern 111 may have a minimum aspect ratio (H2/W) of about 0.1 to about 10, and, in an embodiment, about 0.1 to about 7.0, and, in an embodiment, about 0.1 to about 5.0, and, in an embodiment, about 0.1 to about 1.0. Within this range, the polarizing plate can improve side contrast and side viewing angle when used in an optical display apparatus.

In one embodiment, the polarizing plate according to the present invention includes optical patterns having different aspect ratios within a range of about 0.1 to 5.0.

In an embodiment, the optical pattern 111 may have a maximum height H1 of greater than about 0 μm and less than or equal to about 20 μm, and, in an embodiment, greater than about 0 μm and less than or equal to 15 μm, and, in an embodiment, greater than about 0 μm and less than or equal to 10 μm. Within this range, the polarizing plate can provide improvement in contrast, viewing angle, and brightness while preventing or substantially preventing appearance of Moiré patterns.

In an embodiment, the optical pattern 111 may have a minimum height H2 of greater than about 0 μm and less than or equal to about 10 μm, and, in an embodiment, greater than about 2 μm and less than or equal to 8 μm, and, in an embodiment, about 4 μm to about 6 μm. Within this range, the polarizing plate can provide improvement in contrast, viewing angle, and brightness while preventing or substantially preventing appearance of Moiré patterns.

In an embodiment, the optical pattern 111 may have a maximum width W of greater than about 11 μm and less than or equal to about 35 μm, and, in an embodiment, greater than about 6 μm and less than or equal to 26 μm, and, in an embodiment, greater than about 11 μm and less than or equal to 21 μm. Within this range, the polarizing plate can provide improvement in contrast, viewing angle, and brightness while preventing or substantially preventing appearance of Moiré patterns.

The flat section 112 allows light passing through the first resin layer 110 to enter the second resin layer 120 therethrough, thereby improving front brightness.

In an embodiment, a ratio (W/L) of maximum width W of the optical pattern 111 to width L of the flat section 112 may be greater than about 0 and less than or equal to 9, and, in an embodiment, about 0.1 to about 3, and, in an embodiment, about 0.15 to about 2. Within this range, the flat section can reduce a difference between front contrast and side contrast while improving contrast at a given side viewing angle and a given front viewing angle. In addition, the flat section can be effective in preventing or substantially preventing appearance of Moiré patterns.

In an embodiment, the flat section 112 may have a width L of about 1 μm to about 50 μm, and, in an embodiment, about 1 μm to about 20 μm. Within this range, the flat section can improve front brightness.

The flat section 112 may have a thickness of greater than about 0 μm and smaller than the maximum thickness of the first resin layer 110.

In an embodiment, the first resin layer 110 has a smaller index of refraction than the second resin layer 120. In an embodiment, an absolute value of difference in index of refraction between the first resin layer 110 and the second resin layer may be about 0.05 or more, and, in an embodiment, about 0.05 to about 0.3, and, in an embodiment, about 0.05 to about 0.2. Within this range, the first resin layer 110 can be further effective in diffusing collected light and improving contrast. In an embodiment, the first resin layer 110 may have an index of refraction of about 1.50 or less, and, in an embodiment, about 1.40 to about 1.50, and, in an embodiment, about 1.45 to about 1.48. Within this range, the first resin layer 110 can provide further improved light diffusion.

The first resin layer 110 may be formed of a composition for the first resin layer 110, which includes a curable resin. The composition for the first resin layer 110 may further include an initiator. In one embodiment, the first resin layer 110 may be non-sticky. When the first resin layer 110 is non-sticky, the pattern layer may be laminated on an adherend (for example, the polarizer) via an adhesive, a bonding agent, or an adhesive bonding agent. In another embodiment, the first resin layer 110 may be sticky. When the first resin layer 110 is sticky, a contrast improvement optical film can be laminated on an adherend without using any adhesive, bonding agent, or adhesive bonding agent, thereby allowing reduction in thickness of the polarizing plate.

In an embodiment, the second resin layer 120 may have an index of refraction of about 1.50 or more, and, in an embodiment, more than about 1.50 and less than or equal to about 1.70, for example, about 1.57 to 1.60. Within this range, the second resin layer 120 can provide further improved light diffusion, can be easy to fabricate, and can be further effective in diffusing polarized light and improving contrast.

In an embodiment, the second resin layer 120 may have a maximum thickness of greater than about 0 μm and less than or equal to about 30 μm, for example, greater than about 0 μm and less than or equal to about 20 μm. Within this range, it is possible to prevent or substantially prevent the polarizing plate from suffering warpage, such as curling.

In an embodiment, a minimum distance between an upper surface of the second resin layer 120 and the upper surface of the embossed optical pattern (also referred to as "wall thickness") may have a value of greater than about 0 μm and less than or equal to about 30 μm, for example, greater than about 0 μm and less than or equal to about 20 μm, or greater than about 0 μm and less than or equal to about 10 μm. Within this range, the polarizing plate can minimize or reduce reduction in side contrast.

The polarizer 200 polarizes incoming light from a liquid crystal panel and transmits the polarized light to the pattern layer 100 therethrough. The polarizer 200 is formed on the light entry surface of the pattern layer 100.

The polarizer 200 may include a polyvinyl alcohol-based polarizer prepared by uniaxially stretching a polyvinyl alcohol film, or a polyene-based polarizer prepared by dehydrating a polyvinyl alcohol film. In an embodiment, the polarizer may have a thickness of about 5 μm to about 40 μm. Within this range, the polarizer can be used in an optical display apparatus.

Although not shown in FIG. 1, in an embodiment, the polarizing plate may further include a protective layer formed on at least one surface of the polarizer 200. The protective layer can improve reliability of the polarizing plate by protecting the polarizer 200 while enhancing mechanical strength of the polarizing plate. The protective layer may include at least one selected from the group of an optically clear protective film or an optically clear protective coating layer. In an embodiment, the protective layer may be the same as described below.

The protective layer 300 may be formed on a surface (light exit surface) of the pattern layer 100 to support the pattern layer 100. In an embodiment, the protective layer 300 may be directly formed on the second resin layer 120 of the pattern layer 100, thereby allowing reduction in thickness of the polarizing plate. Herein, the expression "directly formed on" means that no adhesive layer, bonding layer, or adhesive bonding layer is interposed between the protective layer 300 and the pattern layer 100.

The pattern layer 100 is formed on a light entry surface of the protective layer 300. That is, light having passed through the pattern layer 100 may exit the polarizing plate through the protective layer 300.

In an embodiment, the protective layer 300 may have a total transmittance of about 90% or more, for example, about 90% to about 100%, as measured in the visible region. Within this range, the protective layer can transmit incident light therethrough without affecting the incident light.

The protective layer 300 may be a protective film or a protective coating layer which has a light entry surface and a light exit surface opposite the light entry surface. In an embodiment, the protective film is used as the protective layer to more firmly support a contrast improvement layer.

In an embodiment, when the protective layer 300 is the protective film, the protective layer 300 may include a single layer of an optically clear resin film. However, it is to be understood that the present invention is not limited thereto and the protective layer 300 may include multiple layers of an optically clear resin film, for example. The protective film may be prepared by melt extrusion of a resin. A process of stretching the resin may be further performed, as needed. The resin may include at least one selected form the group of a cellulose ester resin including triacetylcellulose (TAC), a cyclic polyolefin resin including amorphous cyclic polyolefin (COP), a polycarbonate resin, a polyester resin including polyethylene terephthalate (PET), a polyether sulfone resin, a polysulfone resin, a polyamide resin, a polyimide resin, a non-cyclic polyolefin resin, a polyacrylate resin including a poly(methyl methacrylate) resin, a polyvinyl alcohol resin, a polyvinyl chloride resin, and a polyvinylidene chloride resin.

Although the protective film may be a non-stretched film, the protective film may be a retardation film or an isotropic optical film, which is obtained by stretching the resin by a certain method (e.g., a predetermined method) and has a certain range of retardation. In one embodiment, the protective film may be an isotropic optical film having an Re of about 0 nm to about 60 nm, and, in an embodiment, about 40 nm to about 60 nm. Within this range, the protective film can provide good image quality through compensation for viewing angle. Herein, "isotropic optical film" refers to a film in which nx, ny, and nz have substantially the same value, and the expression "substantially the same" includes not only the case in which nx, ny, and nz have exactly the same value, but also a case in which there is an acceptable margin of error between nx, ny, and nz values. In another embodiment, the protective film may be a retardation film having an Re of about 60 nm or more. For example, the protective film may have an Re of about 60 nm to about 500 nm, or about 60 nm to about 300 nm. For example, the protective film may have an Re of about 8,000 nm or more, and, in an embodiment, about 10,000 nm or more, and, in an embodiment, more than about 10,000 nm, and, in an embodiment, about 10,100 nm to 30,000 nm or about 10,100 nm to 15,000 nm. Within this range, the polarizing plate can further increase light diffusion through a contrast improvement layer while preventing or substantially preventing appearance of Moiré patterns.

In an embodiment, the protective coating layer may be formed of an actinic radiation-curable resin composition including an actinic radiation-curable compound and a polymerization initiator. The actinic radiation-curable compound may include at least one selected from the group of a cationic polymerizable curable compound, a radical polymerizable curable compound, a urethane resin, and a silicone resin. The cationic polymerizable curable compound may be an epoxy compound having at least one epoxy group per molecule or an oxetane compound having at least one oxetane ring per molecule. The epoxy compound may include at least one selected from the group of a hydrogenated epoxy compound, a chained aliphatic epoxy compound, a cyclic aliphatic epoxy compound, and an aromatic epoxy compound.

Examples of the radical polymerizable curable compound may include a (meth)acrylate monomer having at least one (meth)acryloyloxy group per molecule and a (meth)acrylate oligomer having at least two (meth)acryloyloxy groups per molecule, which may be obtained by reacting at least two compounds containing a functional group. Examples of the (meth)acrylate monomer may include a monofunctional (meth)acrylate monomer having one (meth)acryloyloxy group per molecule, a bifunctional (meth)acrylate monomer having two (meth)acryloyloxy groups per molecule, and a polyfunctional (meth)acrylate monomer having three or more (meth)acryloyloxy groups per molecule. Examples of the (meth)acrylate oligomer may include a urethane (meth) acrylate oligomer, a polyester (meth)acrylate oligomer, and an epoxy (meth)acrylate oligomer. The polymerization initiator serves to cure the actinic radiation-curable compound. The polymerization initiator may include at least one selected from the group of a photocationic initiator and a photosensitizer. The photocationic initiator may include any typical photocationic initiator known in the art. In addition, the photosensitizer may include any typical photosensitizer known in the art.

In an embodiment, the protective layer 300 may have a thickness of about 5 µm to about 200 µm, and, in an embodiment, about 30 µm to about 120 µm. In an embodiment, the protective layer of the protective film type may have a thickness of about 30 µm to about 100 µm, and, in an embodiment, 50 µm to 90 µm, and the protective layer of the protective coating layer type may have a thickness of about 5 µm to about 50 µm. Within this range, the protective layer can be used in the polarizing plate.

In an embodiment, the polarizing plate may further include a surface-treatment layer on at least one surface (at least one of the upper and lower surfaces) of the protective layer 300, wherein examples of the surface-treatment layer may include a primer layer, a hard coating layer, an anti-fingerprint layer, an antireflection layer, an antiglare layer, a low reflectivity layer, and an ultra-low reflectivity layer. The hard coating layer, the anti-fingerprint, the antireflection layer, and the like can provide additional functions to the protective layer, the polarizer, and the like. Particularly, the primer layer can improve bonding of the protective layer to an adherend (for example, the polarizer).

The polarizing plate may be formed by any suitable method known in the art. For example, the polarizing plate may be fabricated by preparing a contrast-improvement optical film by a method as described above and bonding the polarizer 200 to the contrast-improvement optical film. Here, bonding of the polarizer 200 may be performed using at least one selected from the group of a water-based bonding agent and a photo-curable bonding agent, which are commonly known in the art.

Next, a polarizing plate according to another embodiment of the present invention will be described with reference to FIG. 3.

Figure 3:
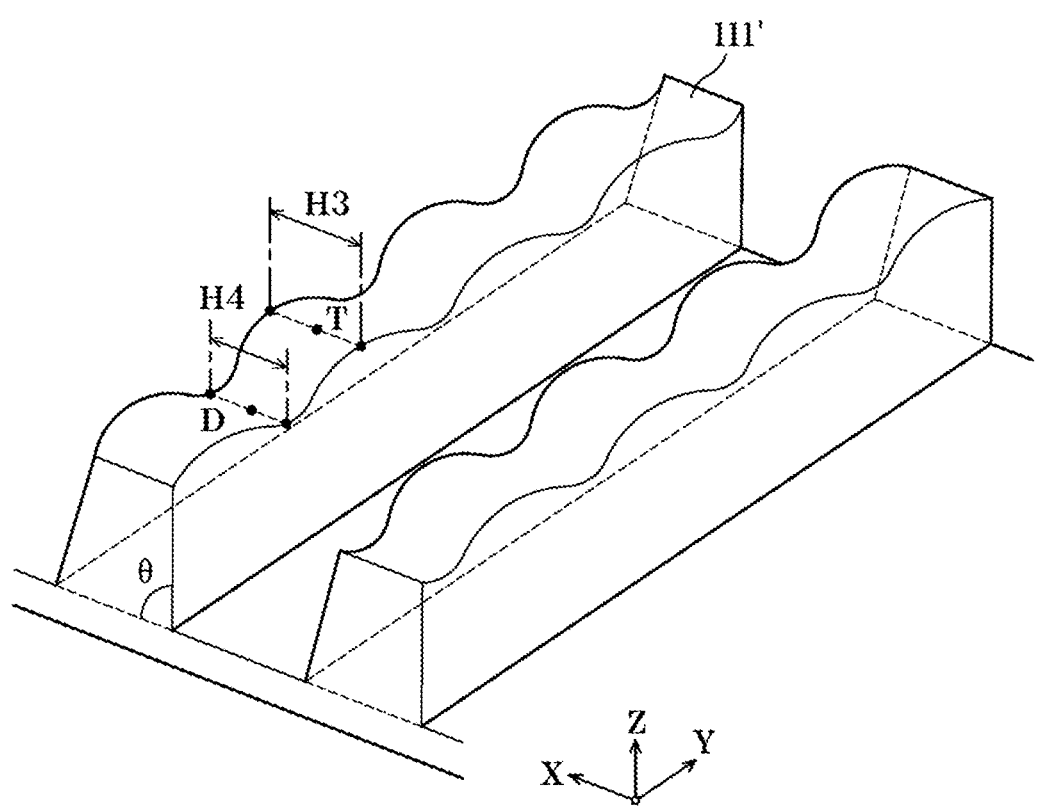
FIG. 3 is a top plan view of an embossed optical pattern of a polarizing plate according to an embodiment of the present invention.

Referring to FIG. 3, in the polarizing plate according to this embodiment, an embossed optical pattern 111' may have a base angle θ of greater than or equal to about 75° and less than about 90°, a convex surface constituting a wave pattern of the embossed optical pattern 111' and having an uppermost point T of the wave pattern therein may have a maximum width H3 greater than a maximum width H4 of a concave surface constituting the wave pattern and having a lowermost point D of the wave pattern therein, and, in an embodiment, a difference between H3 and H4 (H3-H4) may be greater than about 0.1 µm and less than or equal to 1 µm (for example, 0.2 µm, 0.3 µm, 0.4 µm, 0.5 µm, 0.6 µm, 0.7 µm, 0.8 µm, or 0.9 µm), and, in an embodiment, about 0.3 µm to about 0.5 µm. When the polarizing plate satisfies these conditions, the polarizing plate can prevent or substantially prevent appearance of Moiré patterns. In one embodiment, H3 and H4 may be each independently greater than about 0 µm.

A liquid crystal display according to the present invention may include the polarizing plate according to an embodiment of the present invention. In one embodiment, the polarizing plate may be used as a viewer-side polarizing plate with respect to a liquid crystal panel.

In one embodiment, the liquid crystal display may include a backlight unit, a first polarizing plate, a liquid crystal panel, and a second polarizing plate stacked in the stated order, wherein the second polarizing plate may include the polarizing plate according to an embodiment of the present invention. The liquid crystal panel may employ a vertical alignment (VA) mode, an in-plane switching (IPS) mode, a patterned vertical alignment (PVA) mode, or a super-patterned vertical alignment (S-PVA) mode, without being limited thereto. In another embodiment, the polarizing plate according to the present invention may be used as a light source-side polarizing plate. Herein, the term "light source-side polarizing plate" refers to a polarizing plate disposed at a side of a light source with respect to the liquid crystal panel.

Next, the present invention will be described in further detail with reference to some examples. However, it is noted that these examples are provided for purposes of illustration and are not to be construed in any way as limiting the present invention.

Example 1

A resin (PL8540, SAIDEN Chemical Industry Co. Ltd.) was used as a first resin layer (low-refractive index layer) composition.

A resin (SSC5760, SHIN-A T&C Co., Ltd.) was used as a second resin layer (high-refractive index layer) composition.

The second resin layer composition was coated onto a surface (light entry surface) of a polyethylene terephthalate (PET) film (TA044, Toyobo Co., Ltd., thickness: 80 µm) as a protective layer, thereby forming a coating layer. A film having optical patterns and a flat section alternately formed thereon was applied to the coating layer to transfer the optical patterns and the flat section to the coating layer, followed by curing, thereby forming a second resin layer (index of refraction: about 1.57).

The first resin layer composition was coated onto a surface of the prepared second resin layer, followed by curing to form a first resin layer (index of refraction: about 1.45), thereby forming a pattern layer composed of the second resin layer and the first resin layer on the surface of the protective layer. As a result, a laminate of the pattern layer and the protective layer having a shape as shown in FIG. 1 and FIG. 2 was obtained.

A polarizer was prepared by stretching a polyvinyl alcohol film to about 3 times an initial length thereof at 60° C., adsorbing iodine to the stretched film, and further stretching the film to 2.5 times in an aqueous solution of boric acid at 40° C.

A polarizing plate was fabricated by laminating the obtained laminate on a light exit surface of the prepared polarizer such that the first resin layer, the second resin layer, and the protective layer were formed on the polarizer in the stated order.

Specifications of the optical pattern and the flat section of the pattern layer are shown in Table 1.

Examples 2 to 6

A polarizing plate was fabricated in the same manner as in Example 1 except that specifications of the optical pattern and the flat section of the pattern layer were changed as listed in Table 1.

Comparative Examples 1 to 7

A polarizing plate was fabricated in the same manner as in Example 1 except that specifications of the optical pattern and the flat section of the pattern layer were changed as listed in Table 2.

Each of the polarizing plates fabricated in the Examples and Comparative Examples was evaluated as to the following properties. Results are shown in Table 2.

Fabrication of Light Source-Side Polarizing Plate

A polarizer was prepared by stretching a polyvinyl alcohol film to 3 times an initial length thereof at 60° C., and adsorbing iodine to the stretched film, and further stretching the film to 2.5 times in an aqueous solution of boric acid at 40° C. As a base layer, a triacetylcellulose film (thickness: 80 μm) was bonded to both surfaces of the polarizer using a bonding agent for polarizing plates (Z-200, Nippon Goshei Co., Ltd.), thereby fabricating a polarizing plate. The fabricated polarizing plate was used as a light source-side polarizing plate.

Fabrication of Module for Liquid Crystal Display

A module for liquid crystal displays was fabricated by assembling the fabricated light source-side polarizing plate, a liquid crystal panel (PVA mode), and each of the polarizing plates fabricated in the Examples and Comparative Examples in the stated order. Here, assembly was conducted such that the protective layer of the polarizing plate was located outermost.

An LED light source, a light guide plate, and the module for liquid crystal displays were assembled into a liquid crystal display including a single edge-type LED light source (having the same configuration as a Samsung TV (55-inch UHD TV (2016 model), model number: UN55KS8000F) except for the module for liquid crystal displays fabricated using each of the polarizing plates fabricated in the Examples and Comparative Examples).

Brightness in white mode and in black mode was measured at the front (0°, 0°) and the side (0°, 60°) in a spherical coordinate system using an EZContrast X88RC (EZXL-176R-F422A4, ELDIM S.A.).

Front contrast was determined by calculating a ratio of brightness in the white mode to brightness in the black mode, as measured in spherical coordinates (0°, 0°). Side contrast was determined by calculating a ratio of brightness in the white mode to brightness in the black mode, as measured in spherical coordinates (0°, 60°).

Color shift was measured using an EZContrast (ELDIM S.A.).

A module for liquid crystal displays was fabricated in the same manner as in evaluation of contrast and color shift, followed by observing whether Moiré patterns appeared on the module with the naked eye.

Evaluation criteria were as follows.

Good: no Moiré patterns appeared (for example, ).

Poor: a wavy pattern or a hatched pattern appeared (for example,  or ).

TABLE 1

| | | Example | | | | | |
|---|---|---|---|---|---|---|---|
| | | 1 | 2 | 3 | 4 | 5 | 6 |
| Flat section (μm) | | 17 | 17 | 17 | 17 | 17 | 17 |
| Optical pattern | Cross-section | Trapezoid | Trapezoid | Trapezoid | Trapezoid | Trapezoid | Trapezoid |
| | Base angle (θ) (°) | 86 | 86 | 86 | 86 | 86 | 86 |
| | Upper surface | Wave pattern | Wave pattern | Wave pattern | Wave pattern | Wave pattern | Wave pattern |
| | Maximum width (W) (μm) | 17 | 17 | 17 | 17 | 17 | 17 |
| | Maximum height (H1) (μm) | 10 | 10 | 10 | 10 | 10 | 10 |
| | Minimum height (H2) (μm) | 4 | 8 | 4 | 5 | 4 | 4 |
| Wave pattern | Pitch (C) (μm) | 150 | 200 | 200 | 300 | 300 | 350 |
| | Formula 1 | 60% | 20% | 60% | 50% | 60% | 60% |
| | Width of convex surface (H3) (μm) | 15.5 | 15.7 | 15.5 | 15.6 | 15.5 | 15.5 |
| | Width of concave surface (H4) (μm) | 16 | 16 | 16 | 16 | 16 | 16 |
| | Moiré evaluation | Good | Good | Good | Good | Good | Good |
| | Contrast | 5987 | 5983 | 5983 | 6114 | 6014 | 6030 |
| | Side color shift | 0.011 | 0.011 | 0.011 | 0.011 | 0.012 | 0.012 |

TABLE 2

| | | Comparative Example | | | | | | |
|---|---|---|---|---|---|---|---|---|
| | | 1 | 2 | 3 | 4 | 5 | 6 | 7 |
| Flat section (μm) | | 17 | 17 | 17 | 17 | 17 | 17 | 17 |
| Optical pattern | Cross-section | Trapezoid | Trapezoid | Trapezoid | Trapezoid | Trapezoid | Trapezoid | Trapezoid |
| | Base angle (θ) (°) | 86 | 86 | 86 | 86 | 86 | 86 | 86 |
| | Upper surface | Wave pattern | Wave pattern | Wave pattern | Wave pattern | Wave pattern | Wave pattern | Wave pattern |
| | Maximum width (W) (μm) | 17 | 17 | 17 | 17 | 17 | 17 | 17 |
| | Maximum height (H1) (μm) | 10 | 10 | 10 | 10 | 10 | 10 | 10 |
| | Minimum height (H2) (μm) | 4 | 9 | 3 | 4 | 4 | 4 | 4 |
| Wave pattern | Pitch (C) (μm) | 100 | 200 | 300 | 400 | 500 | 600 | 700 |
| | Formula 1 | 60% | 10% | 70% | 60% | 60% | 60% | 60% |
| | Width of convex surface (H3) (μm) | 15.5 | 15.8 | 15.2 | 15.5 | 15.5 | 15.5 | 15.5 |
| | Width of concave surface (H4) (μm) | 16 | 16 | 16 | 16 | 16 | 16 | 16 |
| | Moiré evaluation | Poor | Poor | Poor | Poor | Poor | Poor | Poor |
| | Contrast | 6030 | 6102 | 5891 | 5977 | 6054 | 6091 | 5953 |
| | Side color shift | 0.012 | 0.012 | 0.013 | 0.012 | 0.011 | 0.011 | 0.012 |

As shown in Table 1, the polarizing plate according to one or more embodiments of the present invention provides improvement in front contrast and side contrast and reduction in side color shift while preventing or substantially preventing appearance of Moiré patterns.

Conversely, as shown in Table 2, the polarizing plates of Comparative Examples 1 and 4 to 7, in which a value of pitch of the wave pattern was outside the range set forth herein, failed to prevent appearance of Moiré patterns and thus were rated as "Poor." In addition, the polarizing plates of Comparative Examples 2 and 3, in which a value calculated according to Formula 1 was outside the range set forth herein, failed to prevent appearance of Moiré patterns and thus were rated as "Poor."

It should be understood that various modifications, changes, alterations, and equivalent embodiments may be made by those skilled in the art without departing from the spirit and scope of the invention.

What is claimed is:

1. A polarizing plate comprising:

a polarizer; and a pattern layer on a surface of the polarizer and comprising a first resin layer and a second resin layer facing the first resin layer, the first resin layer comprising a patterned portion located at at least a portion thereof facing the second resin layer, wherein the patterned portion comprises at least two embossed optical patterns each extending along a first direction and a flat section between a pair of adjacent embossed optical patterns of the embossed optical patterns along a second direction crossing the first direction, each of the embossed optical patterns extending along the first direction has an upper surface defining a wave pattern, and the wave pattern has a value of about 20% to 60%, as calculated according to the following Formula 1:

$$(|H1-H2|/H1) \times 100,$$

where H1 denotes a maximum height (unit: μm) of the embossed optical pattern, as measured within the wave pattern, and H2 denotes a minimum height (unit: μm) of the same embossed optical pattern, as measured within the wave pattern, and the wave pattern has a pitch along the first direction of greater than about 100 μm and less than about 400 μm.

2. The polarizing plate according to claim 1, wherein the wave pattern comprises a curved surface defined by a continuous succession of a convex surface and a concave surface, and an uppermost point of one convex surface of a first embossed optical pattern is located between uppermost points of a pair of respective adjacent convex surfaces of a second embossed optical pattern adjacent to the first embossed optical pattern.

3. An optical display apparatus comprising the polarizing plate according to claim 2.

4. The polarizing plate according to claim 2, wherein the convex surface has a maximum length equal to a maximum length of the concave surface.

5. An optical display apparatus comprising the polarizing plate according to claim 4.

6. The polarizing plate according to claim 2, wherein the convex surface has a maximum length different from a maximum length of the concave surface.

7. An optical display apparatus comprising the polarizing plate according to claim 6.

8. The polarizing plate according to claim 1, wherein
the wave pattern comprises a curved surface defined by a continuous succession of a convex surface and a concave surface,
the convex surface has a maximum width greater than a maximum width of the concave surface, and
a difference between the maximum width of the convex surface and the maximum width of the concave surface is greater than 0.1 μm and less than or equal to 1 μm.

9. An optical display apparatus comprising the polarizing plate according to claim 8.

10. The polarizing plate according to claim 1, wherein each of the embossed optical patterns satisfies the following Formula 2:

$1 < P/W \leq 10$, where P denotes a pitch (unit: μm) of the patterned portion and W denotes a maximum width (unit: μm) of the embossed optical pattern, and
the embossed optical pattern has a base angle θ of greater than or equal to about 75° and less than about 90°.

11. An optical display apparatus comprising the polarizing plate according to claim 10.

12. The polarizing plate according to claim 1, wherein each of the embossed optical patterns has a trapezoidal, rectangular, or square cross-section.

13. An optical display apparatus comprising the polarizing plate according to claim 12.

14. The polarizing plate according to claim 1, wherein the second resin layer directly adjoins the embossed optical patterns and the flat section.

15. An optical display apparatus comprising the polarizing plate according to claim 14.

16. The polarizing plate according to claim 1, wherein the first resin layer has a different index of refraction than the second resin layer.

17. The polarizing plate according to claim 16, wherein the first resin layer has a smaller index of refraction than the second resin layer.

18. The polarizing plate according to claim 1, wherein a longitudinal direction of each of the embossed optical patterns is at an angle of about −5° to about +5° with respect to an absorption axis direction of the polarizer.

19. The polarizing plate according to claim 1, further comprising a protective layer on a surface of the pattern layer.

20. An optical display apparatus comprising the polarizing plate according to claim 1.

* * * * *